(12) United States Patent
Wang et al.

(10) Patent No.: US 10,591,504 B2
(45) Date of Patent: *Mar. 17, 2020

(54) INERTIA MEASUREMENT MODULE FOR UNMANNED AIRCRAFT

(71) Applicant: SZ DJI TECHNOLOGY CO., LTD, Shenzhen (CN)

(72) Inventors: Tao Wang, Shenzhen (CN); Tao Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 106 days.

This patent is subject to a terminal disclaimer.

(21) Appl. No.: 15/809,952

(22) Filed: Nov. 10, 2017

(65) Prior Publication Data

US 2018/0088143 A1    Mar. 29, 2018

Related U.S. Application Data

(63) Continuation of application No. 15/231,674, filed on Aug. 8, 2016, now Pat. No. 9,841,432, which is a
(Continued)

(30) Foreign Application Priority Data

Sep. 2, 2011    (CN) .......................... 2011 1 0260585

(51) Int. Cl.
*G01P 1/02* (2006.01)
*G01P 15/08* (2006.01)
(Continued)

(52) U.S. Cl.
CPC .............. *G01P 1/003* (2013.01); *B64D 45/00* (2013.01); *F16F 7/104* (2013.01); *F16F 15/00* (2013.01);
(Continued)

(58) Field of Classification Search
CPC ................ G01C 19/56; G01C 19/5769; G01C 19/5628; G01C 19/16; G01C 19/5663;
(Continued)

(56) References Cited

U.S. PATENT DOCUMENTS 5,115,291 A    5/1992 Stokes
5,239,866 A    8/1993 Froidevaux
(Continued)

FOREIGN PATENT DOCUMENTS

CN    1821717 A    8/2006
CN    101349564 A    1/2009
(Continued)

OTHER PUBLICATIONS

The United States Patent and Trademark Office (USPTO) Notice of Allowance for U.S. Appl. No. 14/241,891 dated Aug. 8, 2017.
(Continued)

*Primary Examiner* — Helen C Kwok
(74) *Attorney, Agent, or Firm* — Anova Law Group, PLLC

(57) ABSTRACT

The present disclosure relates to an inertia measurement module for an unmanned aircraft, which comprises a housing assembly, a sensing assembly and a vibration damper. The vibration damper comprises a first vibration-attenuation cushion; and the sensing assembly comprises a first circuit board, a second circuit board and a flexible signal line for connecting the first circuit board and the second circuit board. An inertia sensor is fixed on the second circuit board, and the first circuit board is fixed on the housing assembly. The inertia measurement module further comprises a weight block, and the second circuit board, the weight block, the first vibration-attenuation cushion and the first circuit board are bonded together. The present disclosure greatly reduces the influence of the operational vibration frequency of the
(Continued)

unmanned aircraft on the inertia sensor and improves the measurement stability of the inertia sensor.

20 Claims, 5 Drawing Sheets

Related U.S. Application Data continuation of application No. 14/241,891, filed as application No. PCT/CN2011/079705 on Sep. 15, 2011, now Pat. No. 9,772,343.

(51) Int. Cl.
| | |
|---|---|
| G01P 1/00 | (2006.01) |
| G01C 19/16 | (2006.01) |
| G01C 19/5628 | (2012.01) |
| G01C 19/5663 | (2012.01) |
| G01C 19/5769 | (2012.01) |
| G01C 19/5783 | (2012.01) |
| G01C 25/00 | (2006.01) |
| F16F 15/00 | (2006.01) |
| G01C 21/16 | (2006.01) |
| F16F 7/104 | (2006.01) |
| B64D 45/00 | (2006.01) |
| G01C 19/56 | (2012.01) |

(52) U.S. Cl.
CPC .............. *G01C 19/16* (2013.01); *G01C 19/56* (2013.01); *G01C 19/5628* (2013.01); *G01C 19/5663* (2013.01); *G01C 19/5769* (2013.01); *G01C 19/5783* (2013.01); *G01C 21/16* (2013.01); *G01C 25/00* (2013.01); *G01P 1/023* (2013.01); *G01P 15/08* (2013.01); *G01P 15/0802* (2013.01); *B64C 2201/14* (2013.01)

(58) Field of Classification Search
CPC . G01C 19/5783; G01P 15/0802; G01P 15/08; G01P 1/023; G01P 1/003; F16F 15/00; B64D 45/00
See application file for complete search history.

(56) References Cited

U.S. PATENT DOCUMENTS

| | | | |
|---|---|---|---|
| 5,546,644 | A | 8/1996 | Kakizaki et al. |
| 5,644,081 | A | 7/1997 | Schwarz et al. |
| 5,668,316 | A | 9/1997 | Iwai et al. |
| 6,145,380 | A | 11/2000 | MacGugan |
| 6,578,682 | B2 | 6/2003 | Braman et al. |
| 6,880,399 | B1 | 4/2005 | Okoshi et al. |
| 7,603,903 | B2 | 10/2009 | Ohta |
| 7,891,244 | B2 | 2/2011 | Ohta et al. |
| 7,938,004 | B1 | 5/2011 | Brunsch et al. |
| 7,939,004 | B2 | 5/2011 | Hirayama et al. |
| 8,826,734 | B2 | 9/2014 | Ohkoshi et al. |
| 9,772,343 | B2* | 9/2017 | Wang ............... F16F 15/00 |
| 9,841,432 | B2* | 12/2017 | Wang ............... F16F 15/00 |
| 10,030,974 | B2* | 7/2018 | Feng ............... G01C 21/265 |
| 2002/0065626 | A1 | 5/2002 | McCall et al. |
| 2004/0045520 | A1 | 3/2004 | Slopsema et al. |
| 2007/0074570 | A1* | 4/2007 | Braman ............... F16F 15/08 |
| | | | 73/504.14 |
| 2007/0113702 | A1 | 5/2007 | Braman et al. |
| 2009/0308157 | A1 | 12/2009 | Eriksen et al. |
| 2010/0037694 | A1 | 2/2010 | Grossman |
| 2010/0257932 | A1 | 10/2010 | Braman et al. |
| 2013/0111993 | A1 | 5/2013 | Wang |
| 2014/0224014 | A1 | 8/2014 | Wang et al. |
| 2016/0349280 | A1 | 12/2016 | Wang et al. |
| 2017/0059319 | A1 | 3/2017 | Feng et al. |
| 2019/0049245 | A1* | 2/2019 | Feng ............... G01C 21/265 |

FOREIGN PATENT DOCUMENTS

| | | | |
|---|---|---|---|
| CN | 101750065 | A | 6/2010 |
| CN | 101922938 | A | 12/2010 |
| CN | 202274882 | U | 6/2012 |
| CN | 102778232 | A | 11/2012 |
| CN | 102980584 | A | 3/2013 |
| CN | 103210280 | A | 7/2013 |
| CN | 203037259 | U | 7/2013 |
| CN | 203249935 | U | 10/2013 |
| EP | 1788277 | A2 | 5/2007 |
| JP | H04297837 | A | 10/1992 |
| JP | 2002022761 | A | 1/2002 |
| JP | 2007093329 | A | 4/2007 |
| JP | 2007163471 | A | 6/2007 |
| JP | 2009053005 | A | 3/2009 |
| WO | 03029756 | A1 | 4/2003 |
| WO | 2011140804 | A1 | 11/2011 |

OTHER PUBLICATIONS

The United States Patent and Trademark Office (USPTO) Office Action for U.S. Appl. No. 15/349,980 dated Jun. 16, 2017.
The United States Patent and Trademark Office (USPTO) Office Action for U.S. Appl. No. 14/241,891 dated Jun. 21, 2017.
Dayou, Noise and Vibration Control Engineering Handbook. China Machine Press, 2002. pp. 577-579.
Harris, et al., Shock and Vibration Handbook. Science Press, Dec. 1990. pp. 2, 19, 606, 610, and 611.
Zhu, et al., College Physics. Textbook Series in Physics for Higher Education. Tsinghua University Press, 2004. pp. 211-223.
The United States Patent and Trademark Office (USPTO) Office Action for U.S. Appl. No. 14/241,891 dated Mar. 1, 2017.
The World Intellectual Property Organization (WIPO) International Search Report and Written Opinion for PCT/CN2015/076012 dated Jan. 20, 2016.
The United States Patent and Trademark Office (USPTO) Office Action for U.S. Appl. No. 15/349,980 dated Jan. 23, 2017.
The United States Patent and Trademark Office (USPTO) Office Action for U.S. Appl. No. 14/241,891 dated Sep. 27, 2016.
The State Intellectual Property Office (SIPO) Chinese Office Action Application No. 201110260585 dated Mar. 3, 2016.
The European Patent Office (EPO) European Office Action for Application No. 11871565.5 dated Jun. 10, 2015.
The European Patent Office (EPO) European Search Report Application No. 11871565.5 dated Mar. 26, 2015.
The World Intellectual Property Organization (WIPO) International Search Report and Written Opinion for PCT/CN2011/079705 dated Dec. 22, 2011.
The Japan Patent Office (JPO) Japanese Office Action for Application 2014-527461 dated Jan. 22, 2015.
The United States Patent and Trademark Office (USPTO) Office Action for U.S. Appl. No. 14/241,891 dated Feb. 11, 2016.
The United States Patent and Trademark Office (USPTO) Office Action for U.S. Appl. No. 14/241,891 dated Jun. 28, 2016.

\* cited by examiner

INERTIA MEASUREMENT MODULE FOR UNMANNED AIRCRAFT

FIELD

The present disclosure generally relates to the technical field of unmanned aircraft control, and more particularly, to an inertia measurement module for an unmanned aircraft.

BACKGROUND

In the conventional technology, for buffering of an inertia measurement module of an unmanned aircraft, four vibration-attenuation cushions are disposed outside a housing of a control module thereof to form four fulcrums that support the housing of the whole control module. The structure of disposing the vibration-attenuation cushions outside the inertia measurement module for the unmanned aircraft has following drawbacks: (1) the vibration-attenuation cushions need be stalled on a platform, so that both the volume and weight of the whole control module are increased, which increases the invalid load of the aircraft and makes it inconvenient to be installed; (2) because the vibration-attenuation cushions are exposed outside, there is a probability that the vibration-attenuation cushions might be damaged, and this has an influence on the service life of the inertia measurement module for the unmanned aircraft; and (3) the buffering effect might be compromised by the main control connections.

SUMMARY

The technical problem to be solved by the present disclosure is that, in view of the problem that disposing the vibration-attenuation cushions outside leads to a bulky volume and a poor buffering effect of the conventional inertia measurement module for the unmanned aircraft, an inertia measurement module for an unmanned aircraft is provided to solve this problem. A technical solution of the present disclosure to solve this technical problem is: providing an inertia measurement module for an unmanned aircraft, which comprises a housing assembly, a sensing assembly and a vibration damper. The sensing assembly and the vibration damper are disposed in the housing assembly. The vibration damper comprises a first vibration-attenuation cushion for buffering vibrations; the sensing assembly comprises a first circuit board, a second circuit board and a flexible signal line for communicationally connecting the first circuit board and the second circuit board. An inertia sensor is fixedly disposed on the second circuit board, and the first circuit board is fixed on the housing assembly. The inertia measurement module further comprises a weight block for increasing weight, and the second circuit board, the weight block, the first vibration-attenuation cushion and the first circuit board are bonded together in sequence into one piece and then fitted into the housing assembly.

Furthermore, in the inertia measurement module for the unmanned aircraft of the present disclosure, the vibration damper further comprises a second vibration-attenuation cushion, which is fixedly bonded on the second circuit board and abuts against an inner wall of the housing assembly.

Preferably, in the inertia measurement module for the unmanned aircraft of the present disclosure, a bonding area $S_2$ between the second vibration-attenuation cushion and the second circuit board is in a range of 12.6 to 50.2 mm$^2$.

Preferably, in the inertia measurement module for the unmanned aircraft of the present disclosure, the weight block has a weight of 1 g to 30 g.

Preferably, in the inertia measurement module for the unmanned aircraft of the present disclosure, a bonding area $S_1$ between the first vibration-attenuation cushion and the second circuit board is in a range of 12.6 to 50.2 mm$^2$.

Specifically, in the inertia measurement module for the unmanned aircraft of the present disclosure, the housing assembly comprises a first housing and a second housing mating with and locked to each other.

Specifically, in the inertia measurement module for the unmanned aircraft of the present disclosure, the second circuit board is fixedly disposed on a supporting sheet, and the supporting sheet is fixedly bonded to the weight block.

Preferably, in the inertia measurement module for the unmanned aircraft of the present disclosure, the inertia sensor comprises a gyroscope for detecting an angular speed signal and an accelerometer for detecting an acceleration signal, the angular speed signal and the acceleration signal are transmitted to the first circuit board via the flexible signal line.

Specifically, in the inertia measurement module for the unmanned aircraft of the present disclosure, a power source, a memory, a processor and a circuit module are fixedly disposed on the first circuit board.

Specifically, in the inertia measurement module for the unmanned aircraft of the present disclosure, the sensing assembly further comprises a signal input interface terminal and a signal output interface terminal, the signal input interface terminal and the signal output interface terminal are connected to the first circuit board through interface signals; and the housing assembly forms an inner chamber that opens at two ends, and the signal input interface terminal and the signal output interface terminal are disposed in the inner chamber and snap-fitted to the two ends of the inner chamber.

The present disclosure has following advantages: components including the inertia sensor and so on that require a high vibration performance, are integrated on the second circuit board, and the vibration damper is disposed to improve the vibration characteristics of the inertia measurement module so that the inherent mechanical vibration frequency of the inertia measurement module is much lower than various vibration frequencies unrelated to movement that are generated by the aircraft. By disposing the first vibration-attenuation cushion, vibrations caused by the unmanned aircraft to the inertia sensor are attenuated quickly, and when frequencies of above 50 Hz are generated by the aircraft, the vibrations suffered by the inertia sensor after the vibration-attenuation cushion is disposed, are attenuated to below 30% of those suffered before the vibration-attenuation cushion is disposed. This greatly reduces the influence of the operational vibration frequency of the unmanned aircraft on the inertia sensor and improves the measurement stability of the inertia sensor; and this also remarkably reduces the volume and weight of the inertia measurement module and enlarges the loading space of the unmanned aircraft.

BRIEF DESCRIPTION OF THE DRAWINGS

Hereinbelow, the present disclosure will be further described with reference to the attached drawings and the embodiments thereof, in which.

DETAILED DESCRIPTION

In order to provide a clearer understanding of the technical features, objects and effects of the present disclosure, embodiments of the present disclosure will be detailed with reference to the attached drawings hereinbelow.

Violent random vibrations are the primary mechanics factor to which a strapdown inertial navigation module is exposed in operation. The vibrations lead to instability in performance of the inertia measurement module or damage of electronic components, and have a great influence on the stability of the inertia measurement module. In order to reduce the damage of components on the circuit board or the instability of the inertia sensor due to violent random vibrations of the unmanned aircraft, the influence of vibrations of the unmanned aircraft on the inertia sensor may be reduced by, on one hand, altering the connecting structures between parts within the housing assembly to enhance the connection rigidity between the parts and, on the other hand, using a vibration damper as a damping medium to elastically connect the inertia measurement module to the unmanned aircraft. The choice of the buffering mode has an influence not only on the buffering performance of the inertial navigation system but also on the measurement accuracy of the system. Accordingly, the present disclosure seeks to improve performances of the miniature inertia measurement module by improving the vibration damper and rationalizing the buffering mechanic structure.

Figure 1:
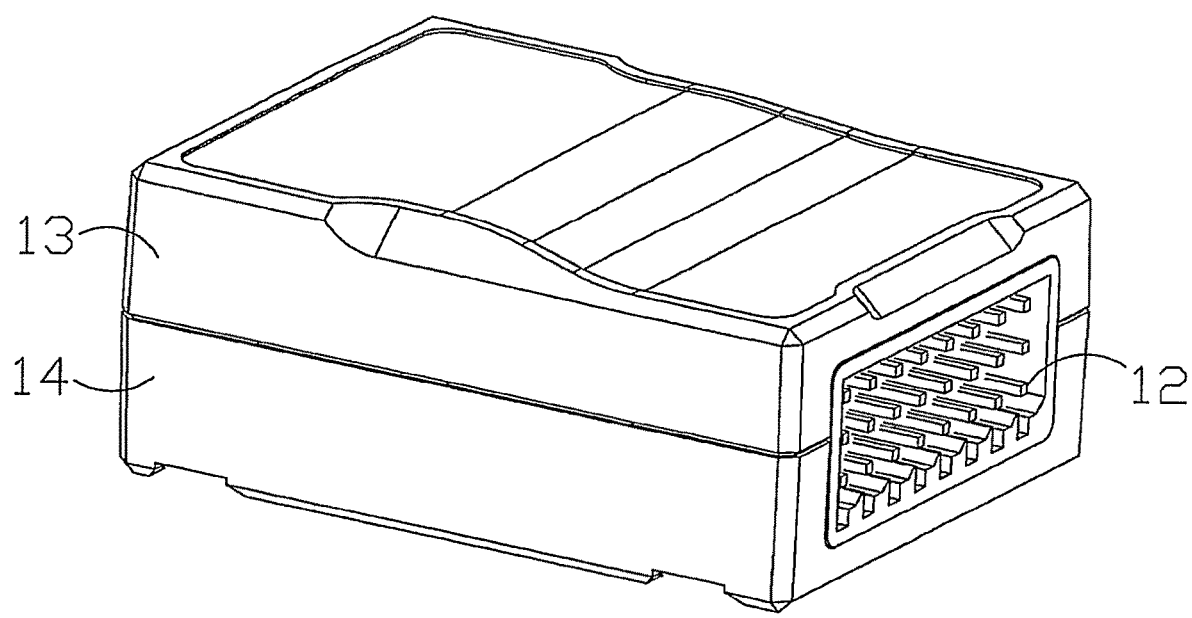
FIG. 1 is a schematic structural view of an inertia measurement module for an unmanned aircraft according to an embodiment of the present disclosure in an assembled state.
Figure 2:
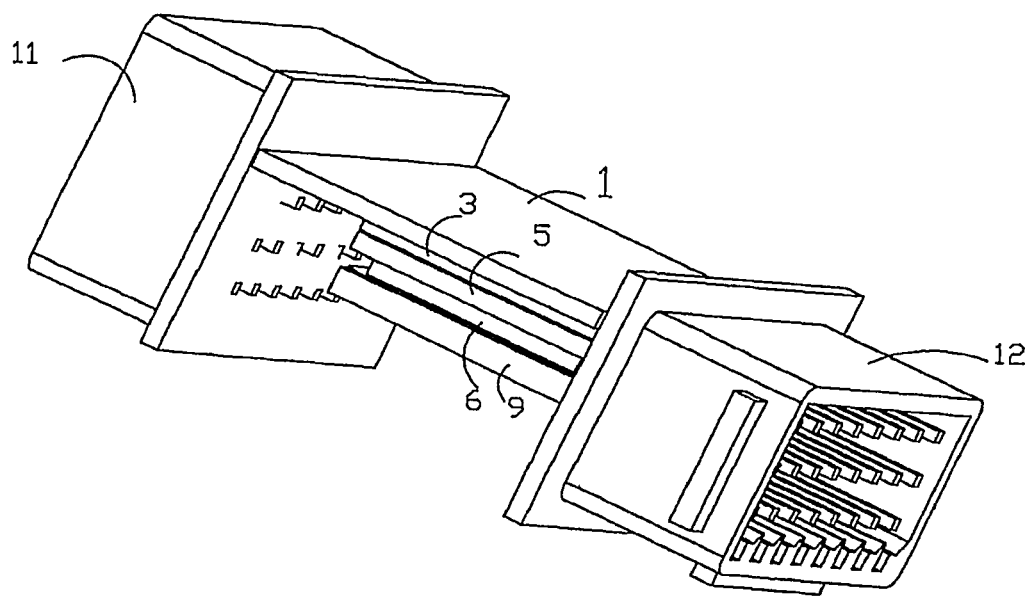
FIG. 2 is a first schematic structural view of the inertia measurement module for an unmanned aircraft according to an embodiment of the present disclosure when a housing assembly is removed.
Figure 3:
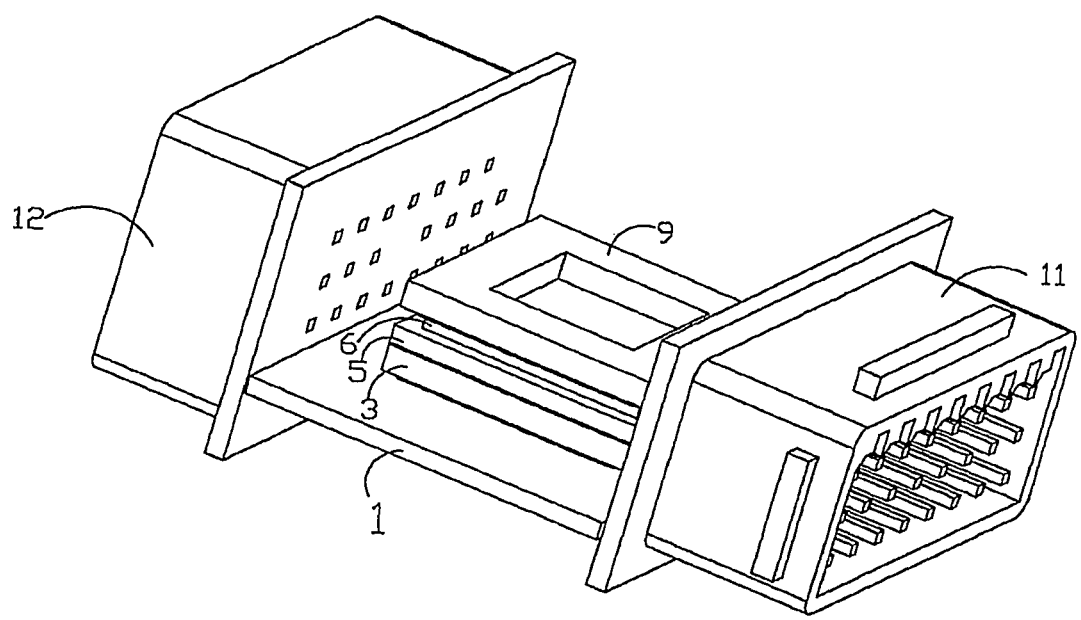
FIG. 3 is a second schematic structural view of the inertia measurement module for an unmanned aircraft according to an embodiment of the present disclosure when the housing assembly is removed.
Figure 4:
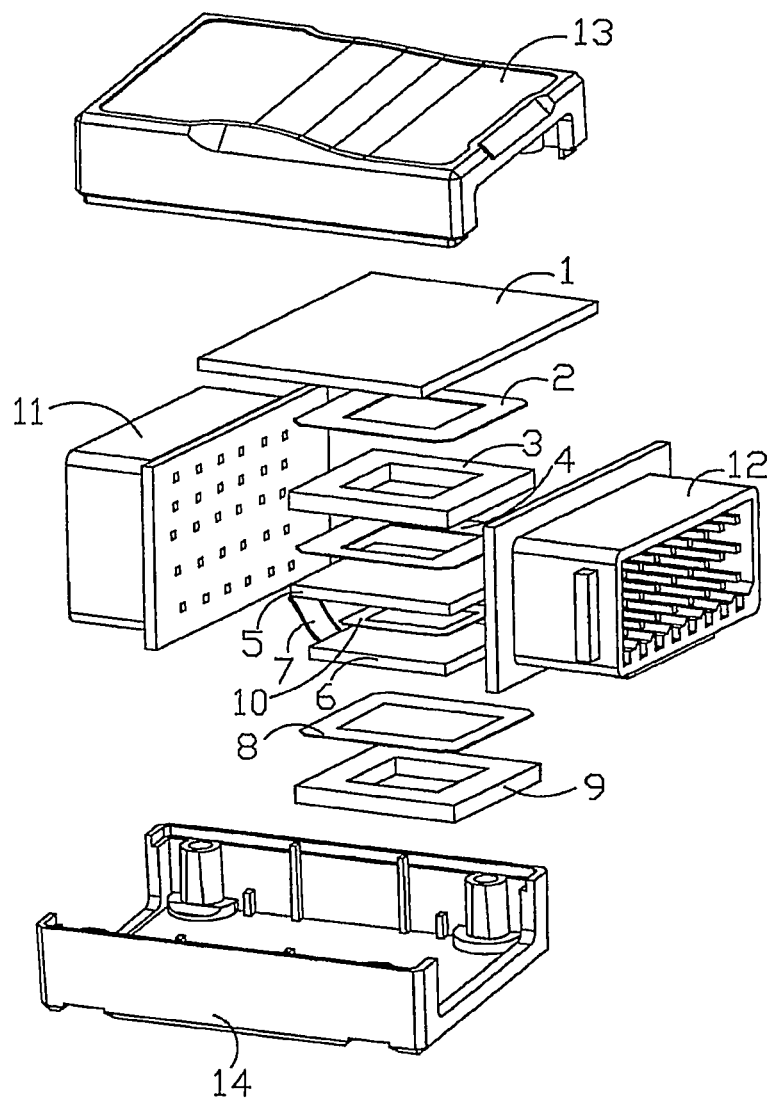
FIG. 4 is a first schematic exploded structural view of the inertia measurement module for an unmanned aircraft according to an embodiment of the present disclosure.
Figure 5:
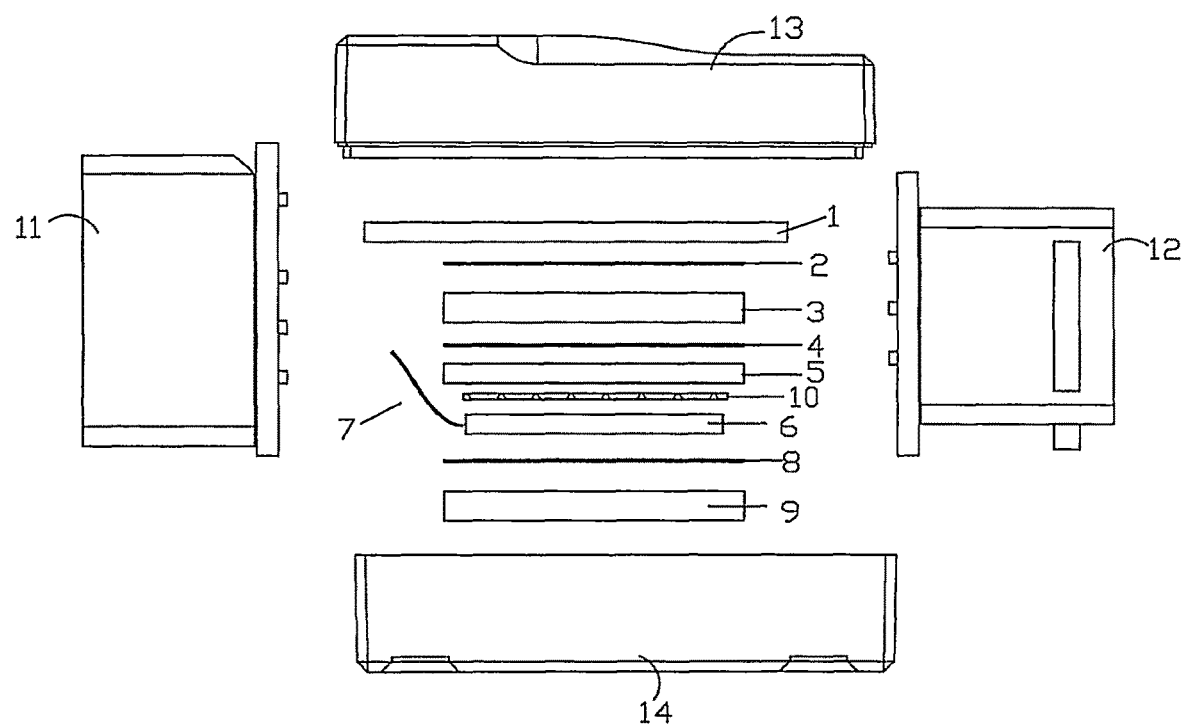
FIG. 5 is a second schematic exploded structural view of the inertia measurement module for an unmanned aircraft according to an embodiment of the present disclosure.

As shown in FIG. 1, FIG. 2 and FIG. 3, an inertia measurement module for an unmanned aircraft according to an embodiment of the present disclosure is shown therein. The inertia measurement module for an unmanned aircraft comprises a housing assembly, a sensing assembly and a vibration damper. As shown in FIG. 1, FIG. 4 and FIG. 5, the housing assembly forms an inner chamber that opens at two ends, and the sensing assembly and the vibration damper are disposed within the inner chamber. As shown in FIG. 4 and FIG. 5, the sensing assembly comprises a first circuit board 1, a second circuit board 6 and a flexible signal line 7 for connecting the first circuit board 1 and the second circuit board 6. The flexible signal line 7 is adapted to transmit various signals detected by sensors on the second circuit board 6 to the first circuit board 1. Components including an inertia sensor and a power source are fixedly disposed on the second circuit board 6. The components that require high vibration performances such as the inertia sensor etc. are integrated into the second circuit board 6, to perform to buffer the inertia sensor by buffering the second circuit board 6, so as to improve the measurement stability of the inertia sensor. To facilitate buffering the second circuit board 6, preferably, the second circuit board 6 is a flexible circuit board. In order to protect the inertia sensor and reduce the influence of vibrations of the unmanned aircraft to the inertia sensor, the vibration damper comprises a first vibration-attenuation cushion 3 for buffering the vibrations as shown in FIG. 4 and FIG. 5. As the first vibration-attenuation cushion 3 is used for buffering the sensing assembly, the size, the density and the material of the first vibration-attenuation cushion 3 and the bonding area between the first vibration-attenuation cushion 3 and the sensing assembly have a great influence on the buffering performances. Preferably, the first circuit board 1 is fixed on the housing assembly by snap-fitting, screwing, riveting, soldering or adhesion. In the inertia measurement module, the inherent frequency thereof is $$f_n = \frac{1}{2\pi}\sqrt{\frac{K}{M}},$$

where K represents the elastic coefficient, and M represents the mass. It can be seen, the greater the mass M is, thus the smaller the inherent frequency $f_n$ will be. To keep the inherent frequency away from the operation frequency of the unmanned aircraft, that is 50 Hz~-200 Hz, the inherent frequency $f_n$ shall be as small as possible and, as can be derived from the above formula, this requires increasing the mass M or decreasing the elastic coefficient K. The elastic coefficient K is affected by the material of the vibration damper and the bonding area thereof, and when the elastic coefficient K is a constant value, the inherent frequency $f_n$ shall be decreased by increasing the mass M. In order to increase the mass M, a weight block 5 for increasing the mass is further included in this embodiment, as shown in FIG. 4 and FIG. 5. The weight block 5 serves to, on one hand, decrease the inherent frequency of the inertia measurement module and, on the other hand, provide a support for positioning the second circuit board 6 so that the parts are connected firmly. As shown in FIG. 4 and FIG. 5, the second circuit board 6 is fixedly bonded to a side surface of the weight block 5, the opposite side surface of the weight block 5 is fixedly bonded to the first vibration-attenuation cushion 3 through an adhesive layer 4, the first vibration-attenuation cushion 3 is bonded to the first circuit board 1 through an adhesive layer 2, and the first circuit board 1 is snap-fitted into the housing assembly. That is, the second circuit board 6, the weight block 5, the first vibration-attenuation cushion 3 and the first circuit board 1 are bonded together in sequence into one piece and then snap-fitted into the housing assembly.

Specifically, as an embodiment of the present disclosure, the vibration damper is made of a special buffering material which has an excellent elastic performance. This can provide the following advantages: by disposing the vibration damper, the vibrations caused by the unmanned aircraft to the inertia sensor can be attenuated quickly, and when frequencies of above 50 Hz are generated by the unmanned aircraft, the vibrations suffered by the inertia sensor after the vibration damper is disposed are attenuated to below 30% of those suffered before the vibration damper is disposed. This greatly reduces the influence of the operational vibration frequency of the unmanned aircraft on the inertia sensor and improves the measurement stability of the inertia sensor.

In order to further provide buffering for the inertia sensor on the basis of the above technical solution so that buffering can be achieved at both the two opposite sides of the second circuit board 6, the vibration damper further comprises a second vibration-attenuation cushion 9 as shown in FIG. 4 and FIG. 5. The second vibration-attenuation cushion 9 is fixedly bonded to the second circuit board 6 and abuts against an inner wall of the housing assembly. The second vibration-attenuation cushion 9 and the first vibration-attenuation cushion 3 are located at two sides of the second circuit board 6 respectively so that forced vibrations caused by the unmanned aircraft from different directions can be absorbed in a balanced way by the two vibration-attenuation cushions. Thus, when the unmanned aircraft flips over, makes a turn, ascends or descends in the air, the inertia sensor on the second circuit hoard 6 can be well protected with a better buffering effect.

Further, as shown in FIG. 4, the second vibration-attenuation cushion 9 is in the form of a hollow cuboid, which has a length of 13 mm~20 mm, a width of 13 mm~20 mm and a thickness of 3 mm~4 mm. It can be appreciated that, the hollow part of the second vibration-attenuation cushion 9 is not limited to be the cuboidal form shown in FIG. 4, but may also be a circular form, an ellipsoidal form, a rhombus form, a quincuncial form or some other regular form. Preferably, the hollow part is in the "$\bigcirc$" form, which is favorable for improving the elasticity of the second vibration-attenuation cushion 9 to enhance the buffering effect. It shall be noted that, the form of the second vibration-attenuation cushion 9 is not limited to the cuboidal form either, but may also be some other regular or irregular form. Preferably, the second vibration-attenuation cushion 9 is in a sheet form for ease of installation.

A multitude of tiny cavities are distributed in the elastic material, and the size and quantity of the cavities have an influence on the performance of the elastic material. The second vibration-attenuation cushion 9 is fixedly bonded to the second circuit board 6 through an adhesive layer 8, and in order to ensure secure bonding, theoretically the bonding area $S_2$ of the adhesive layer 8 shall be as large as possible. However, if the bonding area $S_2$ is too large, the cavities in the elastic material would be blocked by the adhesive layer, and in case the cavities were blocked in a large area in the elastic material, the elasticity of the elastic material would be significantly compromised (i.e., the elastic coefficient K would be increased) to lead to a correspondingly increased $$f_n = \frac{1}{2\pi}\sqrt{\frac{K}{M}}.$$

Therefore, the area of the adhesive layer 8 shall be set to an appropriate size, and the bonding area $S_2$ between the second vibration-attenuation cushion 9 and the second circuit hoard 6 is preferably in a range of 12.6 to 50.2 mm² and, more preferably, is 28.3 mm².

The inherent frequency is $$f_n = \frac{1}{2\pi}\sqrt{\frac{K}{M}},$$

so in order to reduce the inherent frequency as far as possible on the basis of the above technical solution, the weight of the weight block is 1 g~30 g and, preferably, is 15 g, 17.5 g, 20 g or 25 g.

Further, the weight block 5 is made of a metal material having a relatively large density, and is in the form of a cuboid that can save use of space. The cuboid has a length of 13 mm~15 mm, a width of 13 mm~15 mm and a thickness of 3 mm~5 mm. Preferably, the weight block 5 has a length of 15 mm, a width of 15 mm and a height of 4 mm to ensure a good stability. It shall be noted that, the form of the weight block 5 is not limited to the cuboidal form, but may also be some other regular or irregular form. Preferably, the weight block 5 is in a sheet form or a lump form to facilitate tight connection with the second circuit board 6.

In order to reduce the volume of the inertia measurement module and decrease the height of the measurement module on the basis of the above technical solution, preferably a recess that matches in shape with the second circuit board 6 is formed on the weight block 5. The second circuit board 6 is embedded into the recess and fixed with the weight block 5 through adhesion. Embedding the second circuit board 6 into the recess of the weight block 5 can, on one hand, save use of the space and, on the other hand, facilitate quick and uniform dissipation of heat from the second circuit board 6 because of its close attachment to the metallic weight block 5. This can effectively avoid overheating in local regions of the second circuit board 6 to prolong the service life of components of the second circuit board 6.

Similarly, as shown in FIG. 4, the firs vibration-attenuation t cushion 3 is in the same form as the second vibration-attenuation cushion 9. Specifically, the first vibration-attenuation cushion 3 is in the form of a hollow cuboid, which has a length of 13 mm~20 mm, a width of 13 mm~20 mm and a thickness of 3 mm~4 mm. It can be appreciated that, the hollow part of the first vibration-attenuation cushion 3 is not limited to be the cuboidal form shown in FIG. 4, but may also be a circular form, an ellipsoidal form, a rhombus form, a quincuncial form or some other regular form. Preferably, the hollow part is of a "$\bigcirc$" form, which is favorable for improving the elasticity of the first vibration-attenuation cushion 3 to enhance the buffering effect. Similarly, the shape of the first vibration-attenuation cushion 3 is not limited to the cuboidal form either, but may also be some other regular or irregular form. Preferably, the first vibration-attenuation cushion 3 is in a sheet form to facilitate close attachment to the weight block 5. Further, a multitude of tiny cellular cavities are distributed in the elastic material, and the size and quantity of the cavities have an influence on the performance of the elastic material. The first vibration-attenuation cushion 3 is fixedly bonded to the second circuit board 6 through an adhesive layer 2, and in order to ensure secure bonding, theoretically the bonding area $S_1$ of the adhesive layer 2 shall be as large as possible. However, if the bonding area $S_1$ is too large, the cavities in the elastic material would be blocked by the adhesive layer 2, and in case the cavities were blocked in a large area in the elastic material, the elasticity of the elastic material would be significantly compromised (i.e., the elastic coefficient K would be increased) to lead to a correspondingly increased $$f_n = \frac{1}{2\pi}\sqrt{\frac{K}{M}}.$$

Therefore, the area of the adhesive layer 2 shall be set to an appropriate size, and the bonding area $S_1$ between the first vibration-attenuation cushion 3 and the second circuit board 6 is preferably in a range of 12.6 to 50.2 mm² and, more preferably, is 28.3 mm².

Referring to FIG. 1, FIG. 4 and FIG. 5, as a preferred embodiment of the present disclosure on the basis of the above technical solution, the housing assembly comprises a first housing 13 and a second housing 14 mating with and locked to each other, and the first housing 13 and the second housing 14 are snap-fitted with each other to form an inner chamber. Such a structure is favorable for assembly and detachment, and allows for maintaining parts inside the housing assembly timely.

Preferably, the first housing 13 and the second housing 14 are locked to each other by screws. It shall be appreciated that, the first housing 13 and the second housing 14 may also be locked to each other through riveting, snap-fitting or plugging.

On the basis of the above technical solution, the flexible second circuit board 6 is preferably fixed on a supporting sheet as shown in FIG. 5. The supporting sheet is fixedly bonded to the weight block through an adhesive layer 10, and serves to facilitate tight bonding between the second circuit board 6 and the weight block 5.

On the basis of the above technical solution, the adhesive layer 10, the adhesive layer 2, the adhesive layer 8 and the adhesive layer 4 are made of a special material that has good adhesiveness, good resistance to repel and good workability. This kind of adhesive layers may be controlled to be within 0.15 mm in thickness and to provide an adhesive force of 14~17 N/20 mm. It can be appreciated that, the aforesaid adhesive layers may be in sheet form (i.e., surface bonding) or be formed by a plurality of individual portions (i.e., multi-point bonding).

Specifically, a power source, a memory, a processor and a circuit module are fixedly disposed on the first circuit board 1. The inertia sensor comprises a gyroscope for detecting an angular speed signal and an accelerometer for detecting an acceleration signal. The angular speed signal and the acceleration signal are transmitted to the first circuit board 1 via the flexible signal line 7, and are then processed in the memory and the processor for output to control the steering engine of the unmanned aircraft.

Further, as shown in FIG. 1, FIG. 2 and FIG. 3, the sensing assembly further comprises a signal input interface terminal 11 and a signal output interface terminal 12 which are connected to the first circuit board 1 via interface signals. In this embodiment, both the signal input interface terminal 11 and the signal output interface terminal 12 are connected to the first circuit board 1 preferably in an asynchronous serial manner. As shown in FIG. 1, the housing assembly forms an inner chamber that opens at two ends, and the signal interface terminal 11 and the signal output interface terminal 12 are disposed within the inner chamber and snap-fitted to the two ends of the inner chamber. Such a structure is compact and occupies a small space.

Embodiments of the present disclosure have been described above with reference to the attached drawings. However, the present disclosure is not limited to the aforesaid embodiments, and the aforesaid embodiments are provided only for illustration but not for limitation. In light of the present disclosure, those of ordinary skill in the art can make numerous modifications without departing from the spirit of the present disclosure and the scope claimed in the claims, and all these modifications shall fall within the scope of the present disclosure.

What is claimed is:

1. An inertia measurement module for an unmanned aircraft comprising:
   a circuit board with an inertia sensor; and
   a weight block including a recess;
   wherein:
   the circuit board is embedded in the recess; and
   the weight block is configured to have a mass such that an inherent frequency of the inertia measurement module is reduced to be less than an operation frequency of the unmanned aircraft.

2. The inertia measurement module of claim 1, wherein the weight block is made of a metallic material.

3. The inertia measurement module of claim 1, wherein the weight block has a cuboidal shape.

4. The inertia measurement module of claim 1, wherein the weight block has a weight in the range from 1 gram to 30 grams.

5. The inertia measurement module of claim 1, wherein the recess of the weight block has a shape and dimensions substantially matching a shape and dimensions of the circuit board.

6. The inertia measurement module of claim 1, wherein the recess is formed on only one side of the weight block.

7. The inertia measurement module of claim 1, wherein the recess does not form a through-hole extending through the weight block.

8. The inertia measurement module of claim 1, further comprising:
   a vibration damper configured to attenuate vibration of the circuit board.

9. The inertia measurement module of claim 8, further comprising:
   a housing assembly accommodating the circuit board and the weight block;
   wherein the vibration damper includes a vibration-attenuation cushion fixedly bonded to the circuit board and abutting against an inner wall of the housing assembly.

10. The inertia measurement module of claim 9, wherein the vibration-attenuation cushion has a hollow part.

11. The inertia measurement module of claim 10, wherein the hollow part has a cuboidal shape, an circular shape, an ellipsoidal shape, a rhombus shape, or a quincuncial shape.

12. The inertia measurement module of claim 9, wherein the vibration-attenuation cushion is fixedly bonded to the circuit board through an adhesive layer.

13. The inertia measurement module of claim 12, wherein a bonding area of the adhesive layer is in the range from about 3% to about 30% of an area of the vibration attenuation cushion.

14. The inertia measurement module of claim 1, wherein the inertia sensor includes at least one of a gyroscope or an accelerometer.

15. The inertia measurement module of claim 1, wherein the circuit board includes a flexible circuit board.

16. The inertia measurement module of claim 1,
   wherein the circuit board is a second circuit board;
   the inertia measurement module further comprising:
      a first circuit board including at least one of a power source, a memory, a processor, or a circuit module, the first circuit board and the second circuit board being disposed at two opposite sides of the weight block.

17. The inertia measurement module of claim 16, further comprising:
   a signal line coupling the second circuit board to the first circuit board.

18. The inertia measurement module of claim 17, wherein the signal line includes a flexible signal line.

19. The inertia measurement module of claim 1, wherein the operation frequency of the unmanned aircraft is in a range from 50 Hz to 200 Hz.

20. The inertia measurement module of claim 1, wherein the inherent frequency of the inertia measurement module is configured to be less than 50 Hz.

* * * * *